(12) United States Patent
Wang et al.

(10) Patent No.: US 11,760,928 B2
(45) Date of Patent: Sep. 19, 2023

(54) ENHANCED YELLOW-EMITTING CARBON DOTS AND ITS PREPARATION METHOD AND APPLICATION

(71) Applicant: JIANGNAN UNIVERSITY, Wuxi (CN)

(72) Inventors: Chan Wang, Wuxi (CN); Yimin He, Wuxi (CN); Qijun Song, Wuxi (CN); Jianfeng Huang, Wuxi (CN); Yalan Xu, Wuxi (CN); Tao Jiang, Wuxi (CN); Tao Wu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/054,523

(22) Filed: Nov. 10, 2022

(65) Prior Publication Data

US 2023/0075990 A1   Mar. 9, 2023

Related U.S. Application Data

(63) Continuation of application No. PCT/CN2021/131246, filed on Nov. 17, 2021.

(30) Foreign Application Priority Data

Jul. 6, 2021   (CN) .......................... 202110769999.6

(51) Int. Cl.
*G01K 13/00* (2021.01)
*C09K 11/65* (2006.01)
(Continued)

(52) U.S. Cl.
CPC .............. *C09K 11/65* (2013.01); *B82Y 20/00* (2013.01); *B82Y 40/00* (2013.01); *G01K 11/20* (2013.01); *G01K 13/00* (2013.01)

(58) Field of Classification Search
CPC ........ G09K 11/65; B82Y 20/20; B82Y 40/00; G01K 11/20; G01K 13/00
See application file for complete search history.

(56) References Cited

U.S. PATENT DOCUMENTS

2013/0251995 A1* 9/2013 Hao .......................... B32B 5/16
252/301.4 H

FOREIGN PATENT DOCUMENTS

| CN | 108587613 A | * | 9/2018 |
| CN | 108913132 A |   | 11/2018 |

(Continued)

OTHER PUBLICATIONS

First Office Action issued in corresponding Chinese Application No. 202110769999.6; dated Mar. 31, 2022; 16 pgs.

(Continued)

*Primary Examiner* — Gail Kaplan Verbitsky
(74) *Attorney, Agent, or Firm* — HAUPTMAN HAM, LLP (57) ABSTRACT

A method of preparing an enhanced yellow-emitting carbon dots includes dissolving citric acid and urea in N,N-dimethylformamide, reacting at a temperature of 150-180° C. for 4-8 h to obtain a carbonized mixture, separating and purifying the carbonized mixture through column chromatography using an eluent prepared according to a volume ratio of dichloromethane to methanol from high to low, collecting a solution obtained by elution when the volume ratio of dichloromethane to methanol is 1:1-2, performing rotary evaporation to remove the solvent, and drying to obtain the yellow-emitting carbon dot. The yellow-emitting carbon dot with fluorescence intensity enhanced with the increase of temperature is synthesized. The yellow-emitting carbon dots has application value in the fields of temperature detection, biological imaging, photoelectric equipment and the like.

7 Claims, 7 Drawing Sheets

(51) Int. Cl.
*B82Y 20/00* (2011.01)
*B82Y 40/00* (2011.01)
*G01K 11/20* (2006.01)

(56) References Cited

FOREIGN PATENT DOCUMENTS

| | | | | | |
|---|---|---|---|---|---|
| CN | 109111916 | A | * | 1/2019 | |
| CN | 109181687 | B | * | 1/2019 | |
| CN | 110878205 | A | * | 3/2020 | |
| CN | 111269715 | A | * | 6/2020 | ............. B82Y 30/00 |
| CN | 111849474 | A | | 10/2020 | |
| CN | 110643359 | B | * | 3/2021 | |
| CN | 111073393 | B | * | 5/2021 | ............. C08B 15/02 |
| CN | 114968363 | A | * | 8/2022 | |
| CN | 116064031 | A | * | 5/2023 | |
| JP | 2015063535 | A | * | 4/2015 | ......... A61K 41/0057 |
| RU | 2702418 | C1 | * | 10/2019 | |
| WO | WO2010011337 | A | * | 1/2010 | |
| WO | WO-2018154078 | A1 | * | 8/2018 | |

OTHER PUBLICATIONS

Second Office Action issued in corresponding Chinese Application No. 202110769999.6; dated Jul. 20, 2022; 17 pgs.
Notice of Allowance issued in corresponding Chinese Application No. 202110769999 6; dated Aug. 23, 2022; 6 pgs.
Hu, Tantan, et al; Temperature-controlled spectral tuning of full-color carbon dots and their strongly fluorescent solid-state polymer composites for light-emitting diodes, Nanoscale Advances, Jan. 17, 2019; vol. 1, pp. 1413-1420.

* cited by examiner

ENHANCED YELLOW-EMITTING CARBON DOTS AND ITS PREPARATION METHOD AND APPLICATION

RELATED APPLICATIONS

The present application is a Continuation of International Application Number PCT/CN2021/131246, filed Nov. 17, 2021, and claims priority to Chinese Application Number 202110769999.6, filed Jul. 6, 2021, the disclosure of which are hereby incorporated by reference herein in their entireties.

BACKGROUND OF THE INVENTION

1. Technical Field

The invention relates to an enhanced yellow-emitting carbon dots (Y-CDs) and its preparation method and application and belongs to the technical field of functional light-emitting carbon material manufacturing.

2. Description of Related Art

The subtle differences in intracellular temperature can indicate the living status of cells, and real-time and accurate monitoring of temperature has become an important research method in biomedical diagnosis and treatment. However, traditional temperature determination techniques, such as thermocouples, thermistors, resistive temperature monitors and infrared detectors, can difficultly detect the temperature in the microscopic region of the cell, and the biocompatibility of the temperature-sensitive materials used is poor. In recent years, some luminescence information (such as spectral position, spectral band shape, polarization direction, luminescence intensity and decay life) of fluorescent materials in response to temperature have been used to construct fluorescent nanoscale temperature probes to meet the practical needs of intracellular temperature determination. This method has the advantages of non-direct contact, high temporal and spatial resolution, dual functions of temperature response and fluorescence imaging, and simple operation, which is conducive to accurate and portable determination.

As a new photoluminescent material, carbon dots have the advantages of stable fluorescence, good water solubility, no light flicker, adjustable excitation and emission wavelength, good biocompatibility, and low toxicity compared with traditional quantum dots, showing broad application prospects in the field of biosensors and imaging tracers. However, the fluorescence intensity of the existing nanothermometers prepared based on carbon dots is mostly quenched with the increase of temperature. Due to the special and complex biological system, this type of fluorescence quenching probe is easily disturbed by the environment, causing a false positive signal, which is not conducive to the effective and accurate communication of intracellular temperature information. Therefore, it is desired to develop a carbon point with fluorescence intensity enhanced with the increase of temperature to monitor the intracellular temperature.

BRIEF SUMMARY OF THE INVENTION

Based on the deficiency of the prior art, the invention provides an enhanced yellow-emitting carbon dots and its preparation method. The enhanced yellow-emitting carbon dots can be used to detect the temperature in the cell in real time.

A first object of the invention is to provide a preparation method of an enhanced yellow-emitting carbon dots, and the preparation method comprises the following steps:

(1) dissolving citric acid and urea in N,N-dimethylformamide, then transferring the resulting solution to a reactor to react at 150-180° C. for 4-8 h, thus obtaining a carbonized mixture; and (2) separating and purifying the carbonized mixture obtained in step (1) in a chromatography column using an eluent, the eluent being a mixed solvent of dichloromethane and methanol in a volume ratio of 8:1 to 1:1, specifically, separating and purifying the carbonized mixture sequentially using the eluent prepared according to the volume ratio of dichloromethane to methanol from high to low, collecting a solution obtained by elution when the volume ratio of dichloromethane to methanol is 1:1-2, performing rotary evaporation to remove the solvent, and drying to obtain the enhanced yellow-emitting carbon dots.

In an embodiment of the invention, in step (1), the molar ratio of citric acid to urea is 0.14-0.4.

In an embodiment of the invention, in step (2), in the case of separation and purification using the chromatography column, firstly, the carbonized mixture obtained in step (1) is well mixed with silica gel powder and methylene chloride in a certain mass, the solvent is then removed by reduced-pressure distillation, and then the mixture is loaded on the column for separation and purification.

In an embodiment of the invention, the dose of silica gel powder is 8-12 times the mass of the resulting carbonized mixture.

In an embodiment of the invention, the dose of dichloromethane is 3-5 times the mass of the resulting carbonized mixture.

In an embodiment of the invention, in step (2), in the process of separation and purification, the volume ratios of dichloromethane to methanol in the eluent used for sequential elution are 7-8:1, 5-6:1, 3-4:1, and 1:1-2, respectively.

In an embodiment of the invention, in step (2), in the process of separation and purification, the volume ratio of dichloromethane to methanol in the eluent used for elution is 8:1, 5:1, 3:1, 1:1-2, respectively.

In an embodiment of the invention, when the volume ratio of dichloromethane to methanol is 8:1, an indigo carbon dots is obtained; when the volume ratio of dichloromethane to methanol is 5:1, a blue-emitting carbon dots is obtained; when the volume ratio of dichloromethane to methanol is 3:1, an orange-emitting carbon dots is obtained; the solution obtained when the volume ratio of dichloromethane to methanol is 1:1-2 is collected; rotary evaporation is performed to remove the solvent, and freeze-drying is then carried out to obtain the most polar yellow-emitting carbon dots.

In an embodiment of the invention, the volume ratio of dichloromethane to methanol is constantly changed during column chromatography and the most polar yellow-emitting carbon dots obtained when the volume ratio is 1:1 is collected.

A second object of the invention is to provide a yellow-emitting carbon dot prepared by the above preparation method.

In an embodiment of the invention, basic units of the yellow-emitting carbon dots are connected by intramolecular hydrogen bonds.

In an embodiment of the invention, the surface of the yellow-emitting carbon dots retains most functional groups of the carbon source (such as —COOH, —OH, etc.), which promote the connection between multiple basic units in the carbon dots by intramolecular hydrogen bonds. The hydrogen bond breaks at a high temperature, which leads to the increase of rigid structure of the basic unit and the decrease of distortion degree, thus promoting the enhancement of fluorescence intensity of the yellow-emitting carbon dots. With the increase of temperature, intramolecular hydrogen bonds break partially, which enhances the fluorescence intensity of the yellow-emitting carbon dots. Therefore, the yellow-emitting carbon dots prepared according to the invention can achieve a positive response to temperature.

A third object of the invention is to provide a method for determining intracellular temperature by using the above enhanced yellow-emitting carbon dots or the yellow-emitting carbon dots prepared by the above method.

A fourth object of the invention is to provide a nanoscale fluorescent temperature probe or thermometer. The temperature probe or thermometer comprises the yellow-emitting carbon dots prepared by the above preparation method or the enhanced yellow-emitting carbon dots.

A fifth object of the invention is the application of the above enhanced yellow-emitting carbon dots or the above preparation method in the fields of temperature detection, biological imaging, biomedicine, optoelectronic equipment and the like.

Beneficial Effect

1) The yellow-emitting carbon dots synthesized according to the invention has the advantages of high quantum yield, nontoxicity, good biocompatibility and good stability.

2) The invention syntheses the yellow light carbon dots with enhanced fluorescence intensity as the temperature increases, avoiding the problem that the common quenched nanothermometers are susceptible to the environmental influence, which leads to the appearance of false positive signals and cannot realize the accurate detection of temperature. According to the invention, by designing the change of rigid structure induced by intramolecular hydrogen bonds, the yellow-emitting carbon dots with fluorescence intensity enhanced with the increase of temperature is synthesized, and the problem that a common quenching nanothermometer which is easily influenced by the environment to cause a false positive signal cannot accurately detect the temperature is avoided.

3) The yellow-emitting carbon dots prepared according to the invention has application value in the fields of temperature detection, biological imaging, photoelectric equipment and the like.

DETAILED DESCRIPTION OF THE INVENTION

Transmission electron microscope: JEOL JEM 2100plus transmission electron microscope (200 KV accelerating voltage);

Fluorescence spectrometer: Edinburgh FS5 fluorescence spectrophotometer;

Infrared spectrometer: Nicolet 6700 spectrometer;

Ultraviolet visible spectrophotometer: UV-2700 spectrophotometer;

Differential scanning calorimeter: Netzsch DSC 204 F1 analyzer;

Nuclear magnetic resonance spectrometer: Bruker AVANCE III HD spectrometer.

The invention is further described in conjunction with embodiments, but the embodiments of the invention are not limited thereto.

Example 1

1 g of citric acid and 2 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and then was gradually reduced (from 8:1 to 5:1 then to 3:1 and to 1:1 finally). The solution collected when the volume ratio of dichloromethane to methanol was 1:1 was distilled at reduced pressure and further freeze-dried to obtain the most polar yellow-emitting carbon dots powder.

Figure 1:
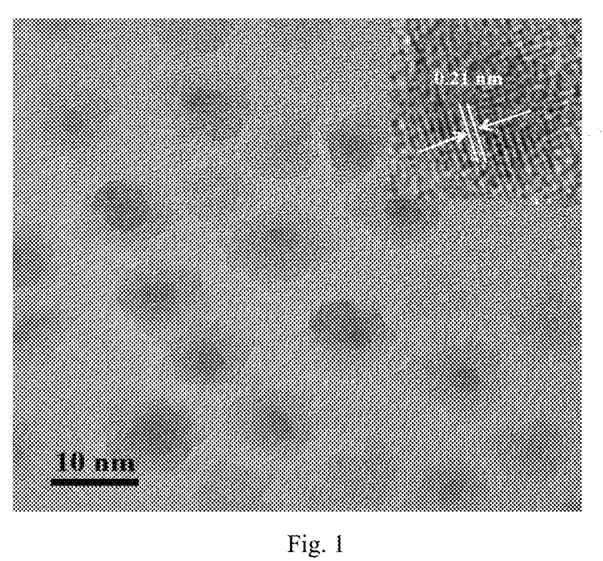
FIG. 1 is a transmission electron microscopy (TEM) image of yellow-emitting carbon dots in Example 1, and the illustration is a high-resolution TEM image.

The obtained powder was dispersed in ultrapure water and tested by the transmission electron microscope. The results are as shown in FIG. 1. The yellow-emitting carbon dots are well dispersed in water, their size distribution is in the range of 5.0 to 12.9 nm, and their average size is about 8.3 nm. In the high-resolution TEM image, the well resolved lattice spacing of 0.21 nm corresponds to the (100) lattice plane of graphene carbon, indicating the successful preparation of the carbon dots.

Figure 2:
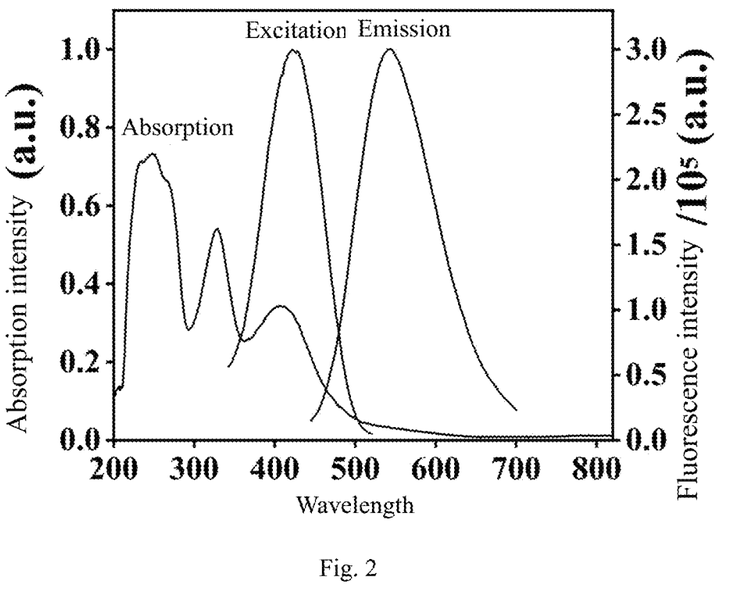
FIG. 2 shows the UV visible absorption, fluorescence excitation and emission spectra of the yellow-emitting carbon dots in Example 1.

Its optical properties were tested by the ultraviolet visible spectrophotometer and the fluorescence spectrometer. The results are as shown in FIG. 2. The prepared material has three obvious absorption peaks at 248 nm, 328 nm and 406 nm, which should be attributed to the $\pi \rightarrow \pi^*$ transition of C=C/C=N bond, the $\pi \rightarrow \pi^*$ transition of C=O/C—O bond and the molecular transition. The optimal excitation and emission wavelengths of the yellow-emitting carbon dots are 425 nm and 540 nm, respectively.

Figure 3:
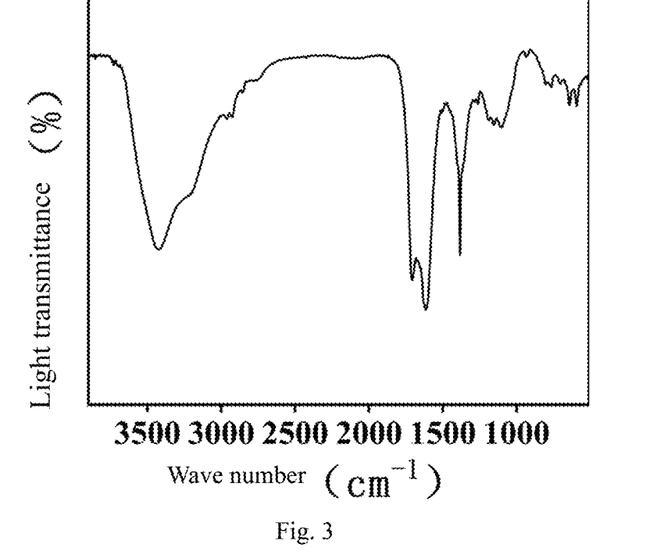
FIG. 3 is the infrared spectrum of the yellow-emitting carbon dots in Example 1.

The structure of the carbon dots was analyzed by infrared spectroscopy. The results are as shown in FIG. 3. The absorption peaks at 3432 $cm^{-1}$ and 3200 $cm^{-1}$ are attributed to the stretching vibration of N—H bond and O—H bond, the absorption peak at 1703 $cm^{-1}$ is attributed to the stretching vibration of C=O bond, the absorption peak at 1624 $cm^{-1}$ is attributed to the stretching vibration of C=N bond, and the stretching vibration peak of C—N bond is at 1384 $cm^{-1}$.

Figure 4:
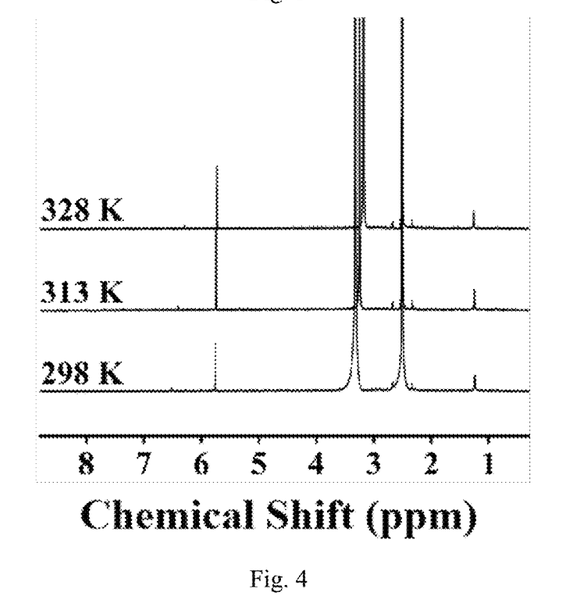
FIG. 4 is the variable-temperature NMR hydrogen spectrum of the yellow-emitting carbon dots in Example 1.

The structure of the carbon dots was tested by the variable-temperature hydrogen spectrum, and the results are shown in FIG. 4. The absorption peak at $\delta$ of 6.5 at room temperature gradually moves to the high field with the increase of temperature, indicating that there are hydrogen bonds in the yellow-emitting carbon dot.

Figure 5:
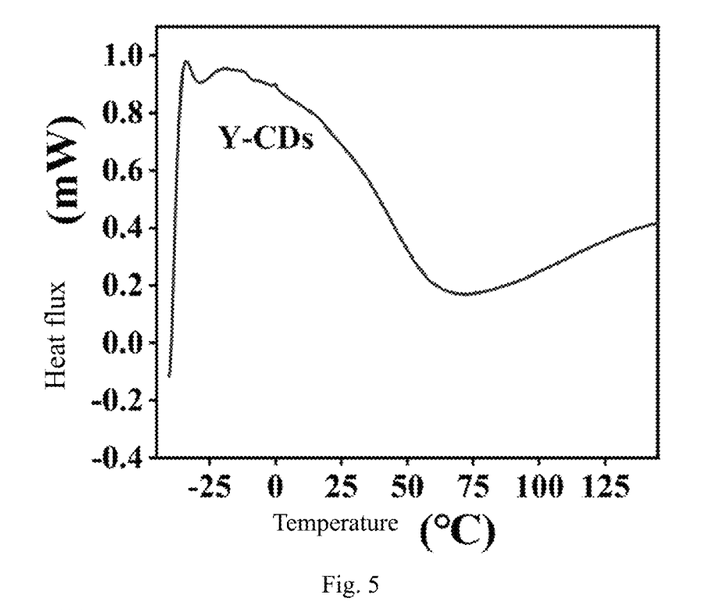
FIG. 5 is the differential scanning calorimetric diagram of the yellow-emitting carbon dots in Example 1.

It can be seen from FIG. 5 that the intramolecular hydrogen bond of the yellow-emitting carbon dots is determined by differential scanning calorimetry (DSC), and the endothermic transition at about 70° C. can be attributed to the break of the intramolecular hydrogen bond.

Figure 6:
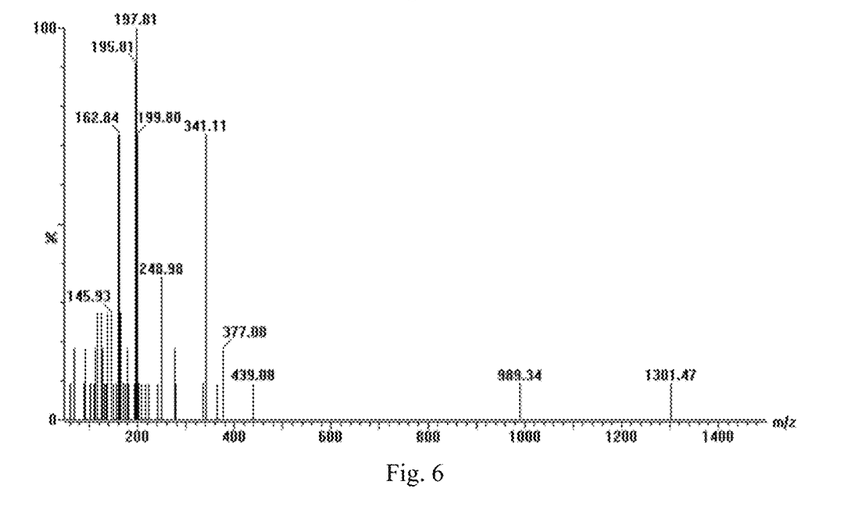
FIG. 6 is the mass spectrum of the yellow-emitting carbon dots in Example 1.

It can be seen from FIG. 6 that the relative molecular weight of the basic units of the yellow-emitting carbon dots is 439.

Figure 7:
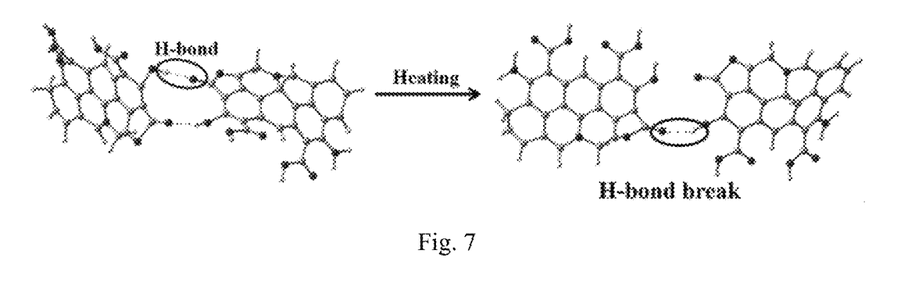
FIG. 7 is the schematic diagram of intramolecular hydrogen bonding between the basic units of the yellow-emitting carbon dots in Example 1.

It can be seen from FIG. 7 that the basic units of the yellow-emitting carbon dots are connected by intramolecular hydrogen bonds. With the increase of temperature, the intramolecular hydrogen bonds are partially broken, resulting in the increase of the rigidity of the carbon dots and the decrease of distortion degree, thus achieving the positive response of its fluorescence intensity to temperature.

Figure 8:
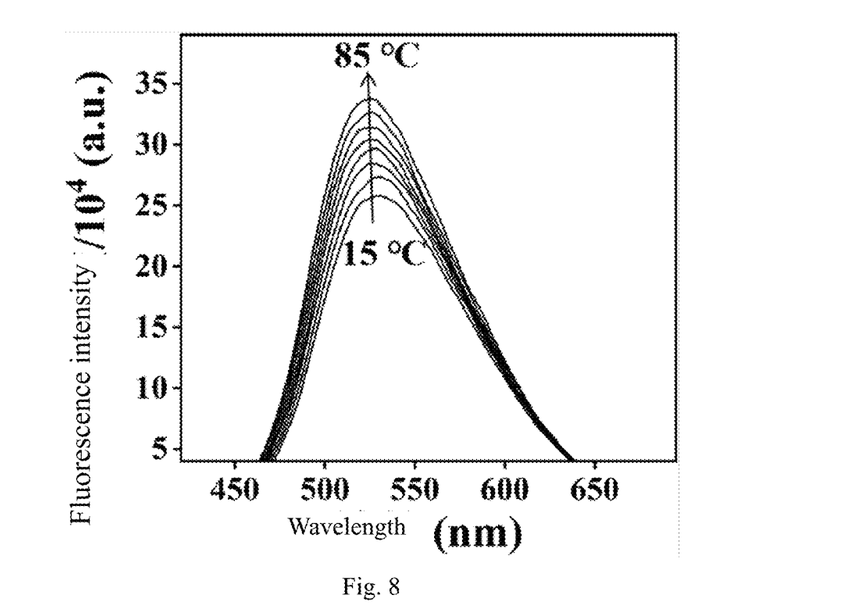
FIG. 8 shows the fluorescence spectrum of the yellow-emitting carbon dots in Example 1 as the temperature increases from 15° C. to 85° C.
Figure 9:
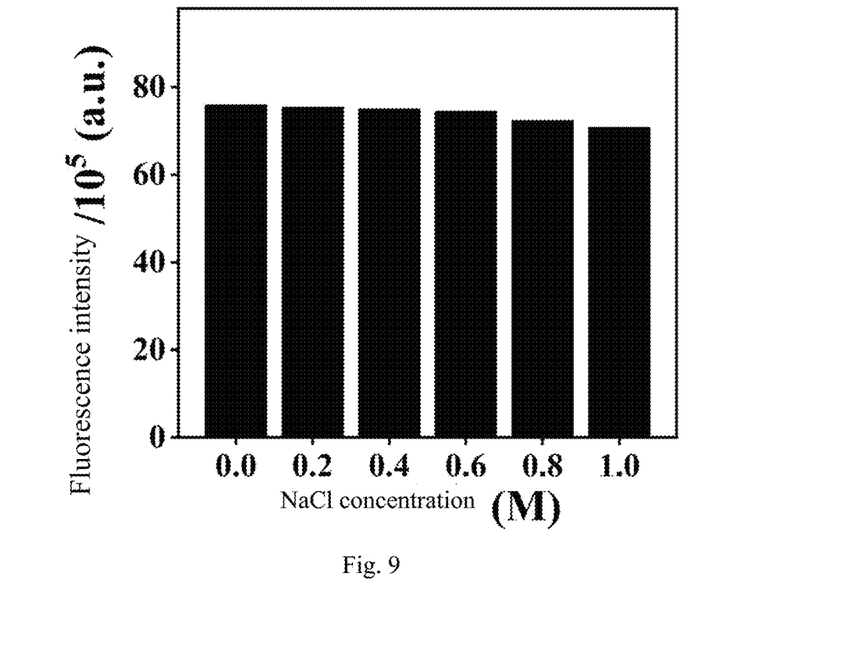
FIG. 9 is the fluorescence intensity diagram of the yellow-emitting carbon dots in Example 1 in the presence of different concentrations of sodium chloride.
Figure 10:
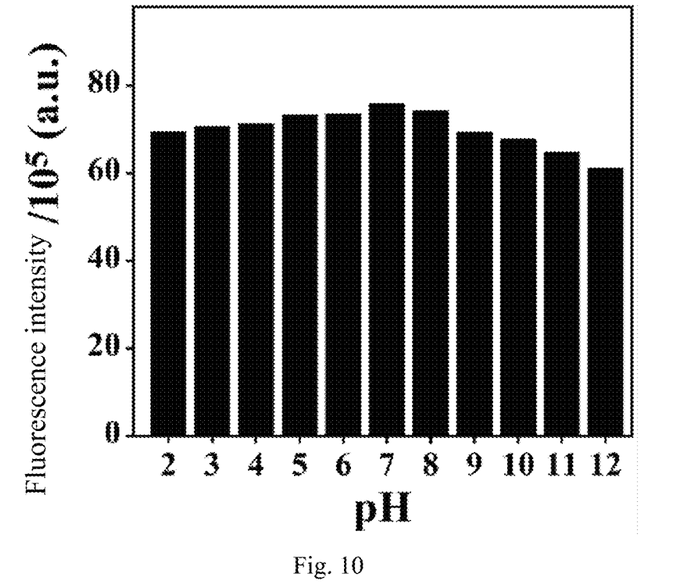
FIG. 10 is the fluorescence intensity diagram of the yellow-emitting carbon dots in Example 1 at pH from 2 to 12.
Figure 11:
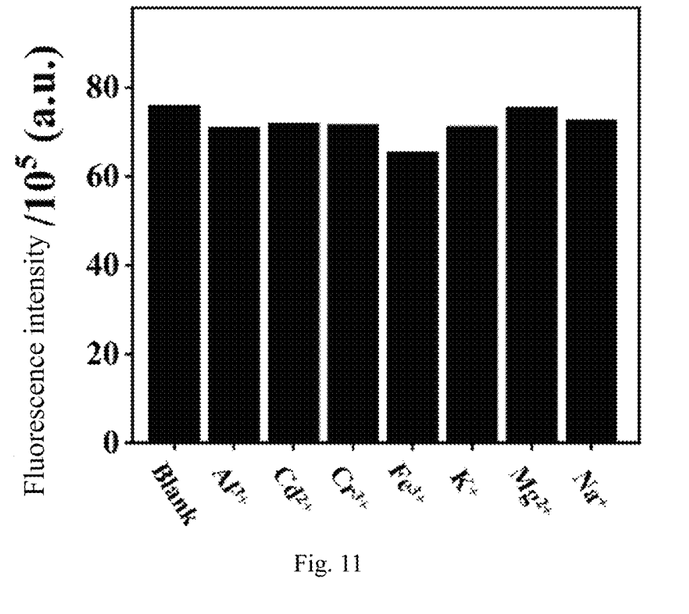
FIG. 11 is the fluorescence intensity diagram of the yellow-emitting carbon dots in Example 1 in the presence of different metal cations.
Figure 12:
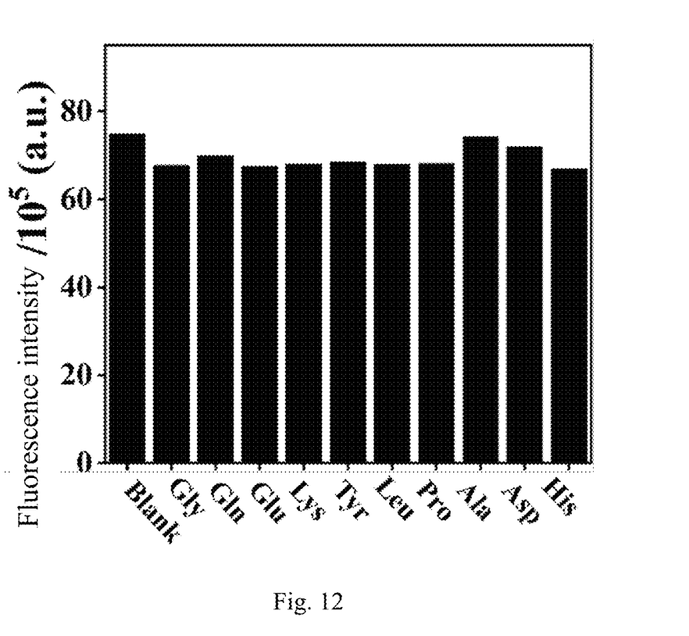
FIG. 12 is the fluorescence intensity diagram of the yellow-emitting carbon dots in Example 1 in the presence of different bioactive molecules.

The temperature sensitivity of the yellow-emitting carbon dots can be proved by FIG. 8. With the temperature increasing from 15° C. to 85° C. gradually, the fluorescence intensity of the yellow-emitting carbon dot increases gradually, indicating that the fluorescence intensity of the yellow-emitting carbon dot is enhanced with the increase of temperature.

The fluorescence intensity of the yellow-emitting carbon dots in different concentrations of sodium chloride solutions, in solutions in different pH environments, in solutions in the presence of different metal cations, and in solutions in the presence of different bioactive molecules is detected respectively. FIGS. 9 to 12 show that the fluorescence intensity of the yellow-emitting carbon dots is basically unchanged in different environments, indicating that the prepared yellow-emitting carbon dots has good fluorescence stability.

Figure 13:
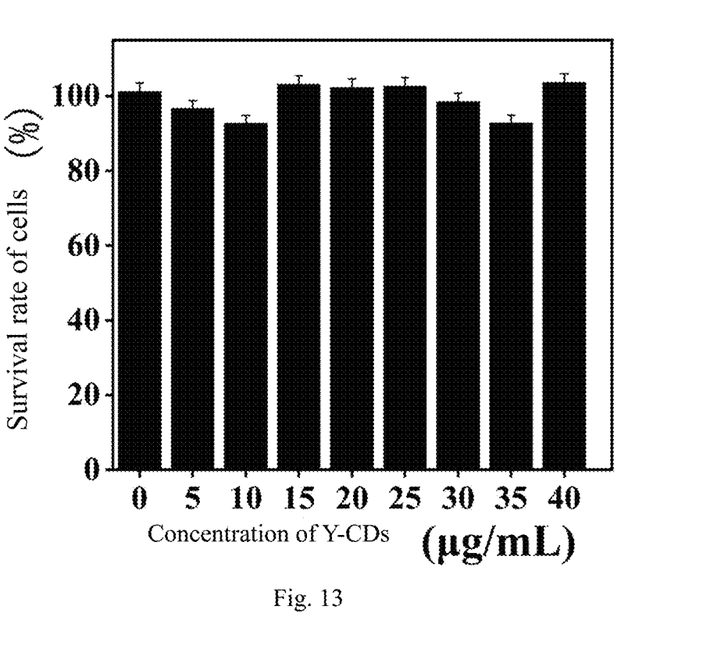
FIG. 13 is the cytotoxicity test diagram of the yellow-emitting carbon dots in Example 1 against Hela cells.

Cytotoxicity test: The cultured Hela cells were incubated in different concentrations of the yellow-emitting carbon dots for 24 h, and the optical density of the mixture was determined at 450 nm. With the cells not incubated in the yellow-emitting carbon dots as a control group with the cell viability of 100%. The higher the optical density determined, the lower its toxicity against cells. As shown in FIG. 13, even if the concentration of the yellow-emitting carbon dots was 40 μg/mL, the viability of cells incubated with the yellow-emitting carbon dots remained 85% or above. This shows that the prepared yellow-emitting carbon dots has good biocompatibility and low toxicity, and can be used for optical temperature determination of living cells.

Figure 14:
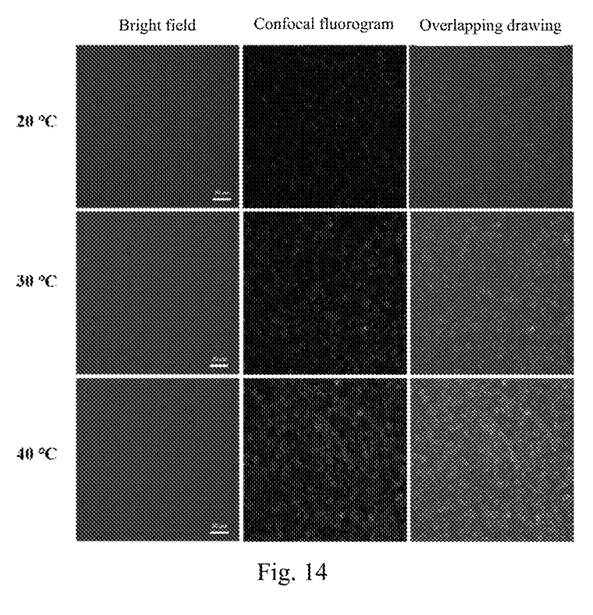
FIG. 14 is the cell imaging diagram of the yellow-emitting carbon dots in Example 1.

As shown in FIG. 14, the image under a confocal laser scanning microscope shows the cell imaging of the yellow-emitting carbon dots and shows good cell morphology. It was observed that the fluorescence intensity of labeled cells was enhanced significantly with the increase of temperature. Therefore, the yellow-emitting carbon dots can be used as fluorescent nanothermometers in organisms.

Example 2

1 g of citric acid and 2 g of urea were weighed and dissolved in N,N-dimethylformamide, and the resulting solution was then heated in a reactor to 160° C. and held at this temperature for 6 h. After the reaction was completed, the reaction solution was cooled to room temperature, and the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 6:1 to 4:1, to 2:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are consistent with those of Example 1 when tested according to the method of Example 1.

Example 3

1 g of citric acid and 2 g of urea were weighed and dissolved in N,N-dimethylformamide, and the resulting solution was then heated in a reactor to 150° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:2 finally). The solution collected when the volume ratio of dichloromethane to methanol was 1:2 was distilled at reduced pressure and further freeze-dried to obtain the most polar yellow-emitting carbon dots powder.

Its fluorescence intensity and test results are consistent with those of Example 1 when tested according to the method of Example 1.

Example 4

1 g of citric acid and 2 g of urea were weighed and dissolved in N,N-dimethylformamide, and the resulting solution was then heated in a reactor to 170° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:2 finally). The solution collected when the volume ratio of dichloromethane to methanol was 1:2 was distilled at reduced pressure and further freeze-dried to obtain the most polar yellow-emitting carbon dots powder.

Its fluorescence intensity and test results are similar to those of Example 1 when tested according to the method of Example 1.

Example 5

1 g of citric acid and 2 g of urea were weighed and dissolved in N,N-dimethylformamide, and the resulting solution was then heated in a reactor to 180° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 7:1 and the volume ratio of dichloromethane to methanol was then gradually reduced (from 7:1 to 6:1, then to 4:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are similar to those of Example 1 when tested according to the method of Example 1.

Example 6

1 g of citric acid and 2 g of urea were weighed and dissolved in N,N-dimethylformamide, and the resulting solution was then heated in a reactor to 160° C. and held at this temperature for 4 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are similar to those of Example 1 when tested according to the method of Example 1.

Example 7

1 g of citric acid and 2 g of urea were weighed and dissolved in N,N-dimethylformamide, and the resulting solution was then heated in a reactor to 160° C. and held at this temperature for 8 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are similar to those of Example 1 when tested according to the method of Example 1.

Example 8

1 g of citric acid and 2.8 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 10 times the mass of the carbonized mixture and dichloromethane in an appropriate mass as much as 5 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are similar to those of Example 1 when tested according to the method of Example 1.

Example 9

1 g of citric acid and 1.4 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are similar to those of Example 1 when tested according to the method of Example 1.

Example 10

1 g of citric acid and 0.78 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:1 finally). The solution collected when the volume ratio of dichloromethane to methanol was 1:1 was distilled at reduced pressure and further freeze-dried to obtain the most polar yellow-emitting carbon dots powder.

Its fluorescence intensity and test results are similar to those of Example 1 when tested according to the method of Example 1.

Comparative Example 1

1 g of citric acid and 2 g of urea were weighed and dissolved in water, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was then gradually reduced (from 8:1 to 5:1, then to 3:1 and to 1:1 finally). As a result, only a blue-emitting carbon dot was obtained, and the fluorescence intensity of the blue-emitting carbon dots was not enhanced with the increase of temperature.

Comparative Example 2

1 g of citric acid and 2 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 30:1 and the volume ratio of dichloromethane to methanol was then gradually reduced (from 30:1 to 20:1, then to 10:1, to 5:1, to 3:1, and to 1:1 finally). The enhanced yellow-emitting carbon dots was not obtained.

Comparative Example 3

1 g of citric acid and 2 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was then purified through column chromatography using dichloromethane and methanol as eluents. The initial volume ratio of dichloromethane to methanol was 3:1 and the volume ratio was then gradually reduced (from 3:1 to 2:1 and then to 1:1). The enhanced yellow-emitting carbon dots was not obtained.

Comparative Example 4

1 g of citric acid and 2 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using petroleum ether and ethyl acetate as eluents. The initial volume ratio of petroleum ether to ethyl acetate was 8:1 and the volume ratio of petroleum ether to ethyl acetate was gradually reduced (from 8:1 to 5:1, then to 3:1 and to 1:1 finally). The enhanced yellow-emitting carbon dots was not obtained.

Comparative Example 5

1 g of citric acid and 2 g of urea were weighed and dissolved in N,N-dimethylformamide, and the resulting solution was then heated in a reactor to 160° C. and held at this temperature for 6 h. After the reaction was completed, the reaction solution was cooled to room temperature, the carbonized mixture obtained from the reaction was then purified through column chromatography using petroleum ether and dichloromethane as eluents. The initial volume ratio of petroleum ether to dichloromethane was 8:1 and the volume ratio of petroleum ether to dichloromethane was then gradually reduced (from 8:1 to 5:1, then to 3:1 and to 1:1 finally). The enhanced yellow-emitting carbon dots was not obtained.

Comparative Example 6

1 g of citric acid and 1.4 g of urea were weighed and dissolved in N,N-dimethylformamide, and the resulting solution was then heated in a reactor to 120° C. and held at this temperature for 6 h. After the reaction was completed, the reaction solution was cooled to room temperature, the carbonized mixture obtained from the reaction was well mixed with silica gel powder in a certain mass as much as 8 times the mass of the carbonized mixture and dichloromethane in an appropriate mass as much as 3 times the mass of the carbonized mixture. The solvent was then removed by reduced-pressure distillation. Purification was then carried out through column chromatography using dichloromethane and methanol as eluents. The initial volume ratio of dichloromethane to methanol was 8:1 and the volume ratio of dichloromethane to methanol was gradually reduced (from 8:1 to 5:1, then to 3:1 and to 1:1 finally). The enhanced yellow-emitting carbon dots was not obtained.

Although the invention has been disclosed in the above preferred embodiments, the invention is not limited thereto, and any person skilled in the art can make various changes and modifications without departing from the spirit and scope of the invention. The scope of the invention should be defined by the claims.

What is claimed is:

1. A preparation method of enhanced yellow-emitting carbon dots for a temperature measuring method using the enhanced yellow-emitting carbon dots to measure the temperature, wherein the preparation method comprises the following steps:
    (1) dissolving citric acid and urea in N,N-dimethylformamide, then transferring a resulting solution to a reactor to react at 150-180° C. for 4-8 h, thus obtaining a carbonized mixture, wherein a molar ratio of citric acid to urea is 0.14-0.4; and
    (2) separating and purifying the carbonized mixture obtained in step (1) in a chromatography column using an eluent, the eluent being a mixed solvent of dichloromethane and methanol; specifically, separating and purifying the carbonized mixture sequentially using the eluent prepared according to a volume ratio of dichloromethane to methanol from high to low, collecting a solution obtained by elution when the volume ratio of dichloromethane to methanol is 1:1-2, performing rotary evaporation to remove the solvent, and drying to obtain the enhanced yellow-emitting carbon dot, wherein in the process of separation and purification, the volume ratio of dichloromethane to methanol in the eluent used for sequential elution is 7-8:1, 5-6:1, 3-4:1, and 1:1-2, respectively,
    wherein in step (2), in the case of separation and purification using the chromatography column, firstly, the carbonized mixture obtained in step (1) is well mixed with silica gel powder and methylene chloride in a certain mass, the solvent is then removed by reduced-pressure distillation, and then the mixture is loaded on the column for separation and purification.

2. The preparation method according to claim 1, wherein a dose of the silica gel powder is 8-12 times the mass of the resulting carbonized mixture and a dose of dichloromethane is 3-5 times the mass of the resulting carbonized mixture.

3. The preparation method according to claim 1, wherein in step (2), in the process of separation and purification, the volume ratio of dichloromethane to methanol in the eluent used for elution is 8:1, 5:1, 3:1, and 1:1-2, respectively.

4. A preparation method of enhanced yellow-emitting carbon dots for a nanoscale fluorescent temperature probe or thermometer comprising the enhanced yellow-emitting carbon dots, wherein the preparation method comprises the following steps:
    (1) dissolving citric acid and urea in N,N-dimethylformamide, then transferring the resulting solution to a reactor to react at 150-180° C. for 4-8 h, thus obtaining a carbonized mixture, wherein a molar ratio of citric acid to urea is 0.14-0.4; and
    (2) separating and purifying the carbonized mixture obtained in step (1) in a chromatography column using an eluent, the eluent being a mixed solvent of dichloromethane and methanol; specifically, separating and purifying the carbonized mixture sequentially using the eluent prepared according to the volume ratio of dichloromethane to methanol from high to low, collecting a solution obtained by elution when the volume ratio of dichloromethane to methanol is 1:1-2, performing rotary evaporation to remove the solvent, and drying to obtain the enhanced yellow-emitting carbon dot, wherein in the process of separation and purification, the volume ratio of dichloromethane to methanol in the eluent used for sequential elution is 7-8:1, 5-6:1, 3-4:1, and 1:1-2, respectively,
    wherein in step (2), in the case of separation and purification using the chromatography column, firstly, the carbonized mixture obtained in step (1) is well mixed with silica gel powder and methylene chloride in a certain mass, the solvent is then removed by reduced-pressure distillation, and then the mixture is loaded on the column for separation and purification.

5. The preparation method according to claim 4, wherein the dose of silica gel powder is 8-12 times the mass of the resulting carbonized mixture and the dose of dichloromethane is 3-5 times the mass of the resulting carbonized mixture.

6. The preparation method according to claim 4, wherein in step (2), in the process of separation and purification, the volume ratio of dichloromethane to methanol in the eluent used for elution is 8:1, 5:1, 3:1, and 1:1-2, respectively.

7. Application of preparation method according to claim 4 in the fields of temperature detection, biological imaging, biomedicine, optoelectronic equipment and the like.

* * * * *